(12) United States Patent
Busch et al.

(10) Patent No.: US 8,922,813 B2
(45) Date of Patent: Dec. 30, 2014

(54) PRINT SERVER FOR A PORTABLE DEVICE

(75) Inventors: Kurt Busch, Laguna Hills, CA (US);
David Lloyd Wagstaff, Lake Forest, CA (US)

(73) Assignee: Lantronix, Inc., Irvine, CA (US)

( * ) Notice: Subject to any disclaimer, the term of this patent is extended or adjusted under 35 U.S.C. 154(b) by 332 days.

(21) Appl. No.: 13/315,956

(22) Filed: Dec. 9, 2011

(65) Prior Publication Data

US 2013/0100487 A1    Apr. 25, 2013

Related U.S. Application Data

(60) Provisional application No. 61/550,247, filed on Oct. 21, 2011.

(51) Int. Cl.
*G06F 3/12* (2006.01)

(52) U.S. Cl.
CPC ............ *G06F 3/1206* (2013.01); *G06F 3/1247* (2013.01); *G06F 3/1288* (2013.01); *G06F 3/1292* (2013.01); *G06F 3/122* (2013.01); *G06F 3/1228* (2013.01)
USPC ...................................................... 358/1.15

(58) Field of Classification Search
CPC ... G06F 3/1204; G06F 3/1292; G06F 3/1226; G06F 3/1288; G06F 21/608; G06F 3/1206; G06F 3/122; G06F 3/1228; G06F 3/1247
See application file for complete search history.

(56) References Cited

U.S. PATENT DOCUMENTS

| | | |
|---|---|---|
| 5,220,674 A | 6/1993 | Morgan et al. |
| 6,678,068 B1 | 1/2004 | Richter et al. |
| 7,016,062 B2 | 3/2006 | Ishizuka |
| 7,265,860 B2 | 9/2007 | Ferlitsch |
| 7,321,443 B2 | 1/2008 | Berkema et al. |
| 7,474,426 B2 | 1/2009 | Benz et al. |
| 7,804,612 B2 | 9/2010 | Wang |
| 8,045,202 B2 | 10/2011 | Shirai |
| 2002/0169002 A1* | 11/2002 | Imbrie et al. .................. 455/557 |

(Continued)

FOREIGN PATENT DOCUMENTS

| | | |
|---|---|---|
| EP | 1271298 | 6/2002 |
| EP | 2026196 | 2/2009 |
| JP | 2007-179197 | 7/2007 |
| WO | 00/54137 | 9/2000 |

OTHER PUBLICATIONS

PC Magazine, Encyclopedia—Definition of Cloud, http://www.pcmag.com/encyclopedia/term/39847/cloud. Accessed Jun. 19, 2014.*

(Continued)

*Primary Examiner* — Fred Guillermety
(74) *Attorney, Agent, or Firm* — Rutan & Tucker LLP; Hani Z. Sayed (57) ABSTRACT

Systems and methods for a print server are provided that includes a processor and a memory coupled to the processor. The memory including instructions causing the processor to receive data from a computing device in a format native to the computing device and process the data received from the computing device into a format native to a printing device connected to the print server. The instructions further cause the system to provide control signals to the print device and provide the data to the print device in the format native to a printer connected to the print server.

20 Claims, 5 Drawing Sheets

(56) References Cited

U.S. PATENT DOCUMENTS

| | | |
|---|---|---|
| 2003/0002072 A1 | 1/2003 | Berkema et al. |
| 2003/0002073 A1 | 1/2003 | Berkema et al. |
| 2003/0090694 A1* | 5/2003 | Kennedy et al. ............. 358/1.13 |
| 2005/0117176 A1 | 6/2005 | Benz et al. |
| 2006/0098226 A1 | 5/2006 | Morita |
| 2007/0124436 A1* | 5/2007 | Shepherd ...................... 709/223 |
| 2008/0037062 A1 | 2/2008 | Omino |
| 2008/0231886 A1 | 9/2008 | Wehner |
| 2009/0033976 A1* | 2/2009 | Ding ........................... 358/1.15 |
| 2010/0103453 A1 | 4/2010 | Tsutsumi |
| 2010/0309510 A1 | 12/2010 | Hansen |
| 2011/0222104 A1 | 9/2011 | Mohammad et al. |
| 2012/0008161 A1 | 1/2012 | Rouhana |

OTHER PUBLICATIONS

Larry Ellison, "What the Hell Is Cloud Computing?", Sep. 25, 2008, https://www.youtube.com/watch?v=0FacYAI6DY0. Accessed Jun. 19, 2014.*

* cited by examiner

PRINT SERVER FOR A PORTABLE DEVICE

CROSS-REFERENCE TO RELATED APPLICATION(S)

This application claims the benefit of, and priority to, U.S. Provisional Application No. 61/550,247, filed on Oct. 21, 2011, entitled "Print Server For A Tablet," which is incorporated by reference in its entirety for all purposes.

FIELD OF THE INVENTION

The present invention relates to printer connectivity and more particularly, to devices that provide connections between one or more print devices and one or more computing devices.

BACKGROUND

The number of mobile electronic devices in use by people has generally increased in many locations. Further, the computing capability of these mobile electronic devices has tended to increase such that many of the devices have greater capabilities when compared to earlier mobile electronic devices. For example, Apple, Inc. has a line of tablet computers known as the iPad. Apple, Inc. also has the iPhone as well as other mobile electronic devices.

As the computing power of mobile electronic devices from Apple, Inc., as well as other mobile electronic device designers, manufacturers, marketers, etc. has generally increased the capabilities of these devices. For example, many of these devices may be used to print directly from the device to a printer.

Because the computing power, memory, data storage, or other capabilities of a mobile electronic device may still tend to be less than some other computing devices such as desktop computers, laptop computers, etc., the print capability provided on these mobile electronic devices may be limited in someway. For example, some systems for mobile operating system printing require printers to accept data provided from the mobile electronic device in a predefined format. Such a system can include a method of printing which uses open standards. Accordingly, such a system may not use a plurality of printer-specific drivers for each printer a user would like to print to. Rather, the printer can use a format native to the mobile electronic device. Such a system can provide for printing via WiFi from various mobile electronic devices to a compatible printer.

By using such a standardized system the mobile electronic device can print without the need for printer-specific drivers. In this way, the complexity of the print routines on the mobile computing device may be decreased and the need for additional memory or data storage for print routines can be avoided. The number of device compatible with mobile wireless device specific printing formats is generally small, however. Additionally, even as greater and greater numbers of such compatible printing devices are designed, marketed, and sold, a larger number of legacy printing systems that are not compatible may continue to be in use for many years to come.

Accordingly, there is a need for systems and methods that may allow electronic devices (such as mobile wireless devices) that may have a standardized printing interface, to print to devices that do not communicate using the mobile wireless device standard printing interface.

SUMMARY OF THE INVENTION

Various embodiments of the systems and methods described herein allow for connectivity between electronic devices and print devices such as printers, plotters, etc. The electronic devices can include mobile wireless devices. In some embodiments, the systems and methods described herein allow for printing to print devices that do not communicate using the electronic device's standard print drivers.

An exemplary embodiment of the present invention provides systems and methods for printing from mobile electronic devices such as an iPad, iPod touch, Android, etc. to a printer that does not include a compatible interface using a print server that receives the document to be printed using a defined standard over WiFi without using, e.g., a Windows, Mac, or Linux personal computer.

In an exemplary embodiment of the present invention, a print server comprising: a processor; a memory coupled to the processor, the memory including instructions causing the processor to: receive data from a computing device in a print format that is native to the computing device; process the data received from the computing device into a format native to a printing device connected to the print server, wherein the data format native to the computing device is different from the format native to a printing device connected to the print server; provide control signals to the print device; and provide the data to the print device in the format native to the print device connected to the print server.

In another exemplary embodiment, the instructions stored in memory allow the print server to communicate with the computing device, which can be a portable device such as an iPad or iPhone, and wherein the instructions allow for communication with a printer that does not include a mobile electronic device specific print standard interface; and wherein the print server is configured to receive documents to be printed using the mobile electronic device specific print standard over WiFi.

In another exemplary embodiment, comprising instructions causing the processor to: discover a printer on a network the print server is connected to, including determining a printer model for the discovered printer; mapping the printer model to a driver needed; and downloading the driver based on the mapping from the printer model.

In another exemplary embodiment, wherein the instructions cause the print server to be able to receive a mobile electronic device specific print standard formatted document, format the data for printing using a printer-specific driver, and transmit the data to the printer.

In another exemplary embodiment, the print server is connected to the printer over a WiFi network.

In another exemplary embodiment, the instructions cause the print server to perform (1) device discovery, (2) capture, and (3) translation and wherein discovery is performed using an auto discovery system.

In another exemplary embodiment, wherein the device connects to a printer by sending a document using the PDF format, the Post Script format, or PCL.

In another exemplary embodiment, wherein the print server provides printer driver management.

In another exemplary embodiment, wherein the print server provides a connection between a plurality of devices by using USB, Ethernet, or 802.11 communications, or a combination of these.

In another exemplary embodiment, wherein the print server provides for manually inputting printer information.

In another exemplary embodiment, wherein the print server automatically discovers a printer and automatically downloads a driver for the printer.

In an exemplary embodiment, a method of printing from a computing device comprising: receiving data at a print server from a computing device in a print format that is native to the computing device; converting the data received from the computing device into a format native to a printing device connected to the print server, the conversion occurring in the print server, wherein the data format native to the computing device is different from the format native to a printing device connected to the print server; providing control signals from the print server to the print device; and providing the data to the print device in the format native to the printing device connected to the print server.

In another exemplary embodiment, comprising: communicating with the computing device; communicating with a printer that does not include a mobile electronic device specific print native interface; and configuring the print server to receive document to be printed using the mobile electronic device specific print standard over WiFi.

In another exemplary embodiment, further comprising downloading a first printer-specific drivers to the print server that provides the data to the print device in the format native to the print device connected to the print server; and downloading a second printer-specific driver from a print driver database stored in a cloud of networked computers as needed when a printer not supported by the first printer-specific driver is connected to the print server the second print-specific driver supporting the printer that is not supported by the first printer-specific driver.

In another exemplary embodiment, receiving a mobile electronic device specific print standard formatted document; formatting the data for printing using a printer-specific driver, and transmitting the data to the printer.

In another exemplary embodiment, further comprising connecting to the printer over a WiFi network.

In another exemplary embodiment, further comprising performing (1) device discovery, (2) capture, and (3) translation and wherein discovery is performed using an auto discovery system.

In another exemplary embodiment, further comprising sending a document using the PDF format, the Post Script format, or PCL.

In another exemplary embodiment, comprises providing printer driver management.

In another exemplary embodiment, comprising providing a connection between a plurality of devices by using USB, Ethernet, or 802.11 communications, or a combination of these.

In another exemplary embodiment, comprising: discovering a printing device; capturing data from the printing device; and translating the data from the printing device.

In an exemplary embodiment, the print server includes printer-specific drivers.

In an exemplary embodiment, the print server can download printer-specific drivers.

In an exemplary embodiment, the print server can download printer-specific drivers from the Internet, e.g., using a web site.

In an exemplary embodiment, the print server can receive a mobile device print standard formatted document, format the data for printing using a printer-specific driver, and transmit the data to the printer.

In an exemplary embodiment, the print server is connected to the printer over a WiFi network.

In an exemplary embodiment, the print server is connected to the printer using a universal serial bus connection.

In an exemplary embodiment, it is contemplated that the system may allow a generic printer to appear to be a mobile electronic device specific print standard printer to a wireless electronic device.

In an exemplary embodiment, no software is loaded onto the wireless electronic device.

Still another exemplary embodiment, the present invention allows for printing to, for example, a laser printer.

In an exemplary embodiment, a system and method for connecting a plurality of devices using USB, Ethernet, 802.11 (e.g., 802.11b, 802.11n, etc.) or a combination of these.

Still another exemplary embodiment is to provide a system and method for performing (1) printer discovery, (2) capture, and (3) translation. Discovery may be performed using an auto discovery system or by manually inputting printer information.

In yet another exemplary embodiment, a system and method may use Bonjour, which is a trade name for an implementation of a group of technologies that includes service discovery, address assignment, and name resolution. Bonjour may be used to locate printers, computers, services, etc.

Yet another exemplary embodiment is to provide a system and method to connect a printer by sending a document using the PDF format.

Still another exemplary embodiment provides a system and method to connect a printer including performing a PDF to Post Script conversion.

Another exemplary embodiment provides a system and method to connect a printer including performing a PDF to PCL conversion.

Further, in an exemplary embodiment, the system may be portable or mobile.

It is contemplated that the system provides printer driver management.

Additionally, it should be understood that, while embodiments of the invention are generally described with respect to wireless electronic devices, other computing devices might be connected to a printer using the systems and methods described herein. In this way much of the printing overhead might be moved from the computing device to the print server. This may save computer storage space by eliminating the need for multiple print drivers. (A single system might be used, e.g., mobile electronic device specific print standard to connect to multiple printers, for example.)

BRIEF DESCRIPTION OF THE DRAWING

The multiple drawings refer to the embodiments of the invention.

Various objects, features, aspects and advantages of the present invention will become more apparent from the following detailed description of preferred embodiments of the invention. While the invention is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the invention.

DETAILED DESCRIPTION

In the following description, numerous specific details are set forth, such as examples of specific voltages, named components, connections, types of circuits, etc., in order to provide a thorough understanding of the present invention. It will be apparent, however, to one skilled in the art that the present invention may be practiced with or without these specific details. In other instances, well known components or methods have not been described in detail but rather in a block diagram in order to avoid unnecessarily obscuring the present invention. Further specific numeric references such as a first device server, a second device server, etc. may be made. However, the specific numeric reference should not be interpreted as a literal sequential order but rather interpreted that the first device server is different than the second device server. Thus, the specific details set forth are merely exemplary. The specific details may be varied from and still be contemplated to be within the spirit and scope of the present invention.

Figure 1:
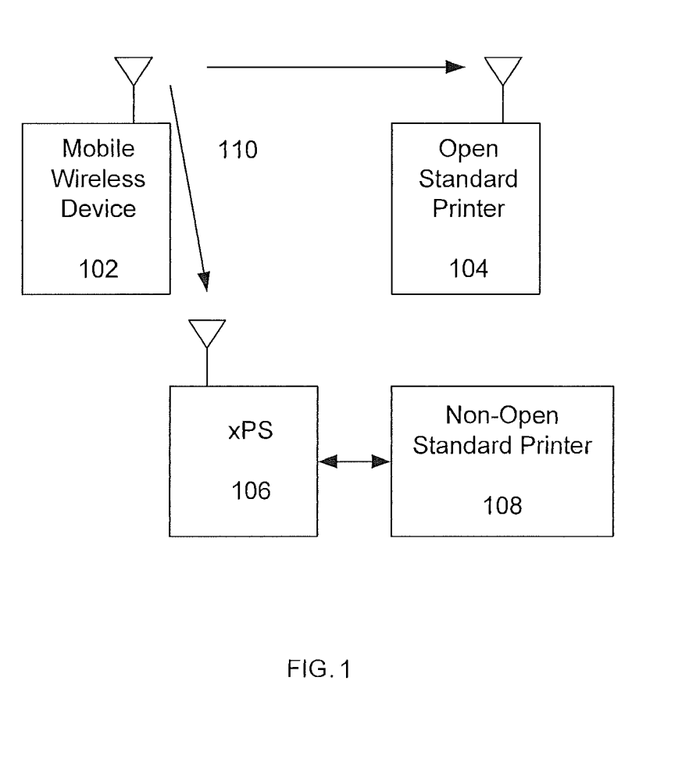
FIG. 1 is a block diagram illustrating an example of a wireless connection between a mobile electronic device using an open print standard.

FIG. 1 illustrates a block diagram 100 including a wireless connection between a portable device such as a mobile wireless device 102 and an open standard printer 104 as well as between the mobile wireless device 102 and a print server 106 connected to a non-open standard printer 108. The print server 106 is connected to a printer that does not necessarily include a printing interface that is mobile wireless device specific or perhaps includes a mobile wireless device specific print standard for a type of mobile wireless device other than mobile wireless device 102. In other words, print server 106 may be used to connect mobile wireless devices 102 to printers that do not include print standards for the specific mobile wireless device 102 used, even when other mobile wireless devices are of a native format for the printer 108.

Mobile wireless device 102 may print directly to open standard printer 104. In an example, the open standard printer 104 includes print drivers that can receive wireless signals from mobile wireless device 102. The printer 104 can interpret these signals 110 and then print the material received.

Mobile wireless device 102 may include mobile electronic devices such as an iPad, iPod touch, Android, as well as other types of mobile telephone handsets, notebooks, laptops, and other mobile wireless devices that may print documents to a printer. The printer 104 may include special hardware, software, or both that processes predefined printing instructions such that the mobile wireless device may not need printer specific print drivers, or may include a simplified set of print drivers. The document to be printed may be transmitted by the mobile wireless device 102 over a network such as e.g., WiFi, or other wireless connection, including wired Ethernet, cellular, satellite, or any other method of networking devices; through a cable or by other means without connecting through a Windows, Mac, Linux, or other personal computer or server.

An exemplary embodiment illustrated in FIG. 1 provides systems and methods for printing from the mobile wireless device 102 (e.g., iPad, iPod touch, Android, etc.) to a printer 108 that does not include a device specific compatible interface such as special hardware, software, or both that processes predefined printing instructions such that of the mobile wireless device. The system can use print server 106. The print server 106 can receive a document to be printed using a defined standard over the network, e.g., WiFi, or other wireless or wired connection; through a cable or by other means. The print server 106 can include hardware, software, or both that processes predefined printing instructions from the mobile wireless device 102 to allow for connectivity between mobile wireless device 102 and print devices that do not communicate using the mobile wireless device's 102 standard printing interface. The system may allow a generic printer 108 to appear to be a mobile electronic device specific print standard printer (such as printer 104) to the mobile wireless device 102.

Print server 106 can include printer-specific drivers. In an exemplary embodiment, the print server 106 can receive a mobile device print standard formatted document, format the data for printing using the printer-specific driver, and transmit the data to the printer 108. The printer-specific drivers may be preloaded on the device or they may be downloaded by the print server 106 from, for example, the internet. The drivers might be updated from time to time or changed as the printer 108 connected to the print server 106 is changed.

In an exemplary embodiment, print server 106 may be connected to a plurality of devices (e.g., printers) using USB, Ethernet, 802.11 (e.g., 802.11b, 802.11n, etc.) or a combination of these. In another exemplary embodiment, the print server 106 is connected to the printer 108 or printers using a universal serial bus connection. Other exemplary embodiments include a print server 106 that is connected to the printer 108 over a wireless network such as a WiFi network, a cellular network, a satellite based network. In other embodiments, wired connections such as wired Ethernet might be used. It will be understood that print server 106 might include one or more of these and other connection types.

Some embodiments of the systems and methods describe herein may allow for printing from a wireless mobile device OS via wired or wireless networks such as wired Ethernet or wireless WiFi, to a non-compatible printers without the use of a Windows, Mac, Linux, or other PC without printer-specific drivers.

Some embodiments of the systems and methods described herein enable any application (web, desktop, mobile) on a mobile wireless device in a network "cloud" to print to any printer without the service provider of the cloud having to create and maintain printing subsystems for all the hardware combinations of client devices and printers, and without the users having to install drivers to the client. Rather, a print server device 106 may be used to connect the printer 108 to the cloud. Applications can print through a web-based, common print dialog (web UI) or an API to the print server 106.

It is contemplated that the system provides printer driver management. For example, print server 106 may also be connected to the internet, e.g., over a wireless 802.11 network. Periodically the print server 106 may poll a predetermined web site and determine if an updated print driver or drivers is available. Similarly, if a different printer is connected to print driver and print server 106 does not include a print driver for this type of printer, then it may be necessary to download a print driver for the print server 106 that will allow the print server 106 to print to the newly installed printer.

It will be understood that printer server 106 may be connected to one or more printers. These printers may or may not be the same type of printer. Accordingly, it may be necessary for the print server 106 to manage one or more types of print drivers. Thus, print server 106 may include enough memory to store one or more print drivers. (It will, however, also be understood that some print servers 106 may be intended to connect to only one printer or only one type of printer at a time. This may allow for systems that are more economical for, e.g., consumer purchase.)

Figure 2:
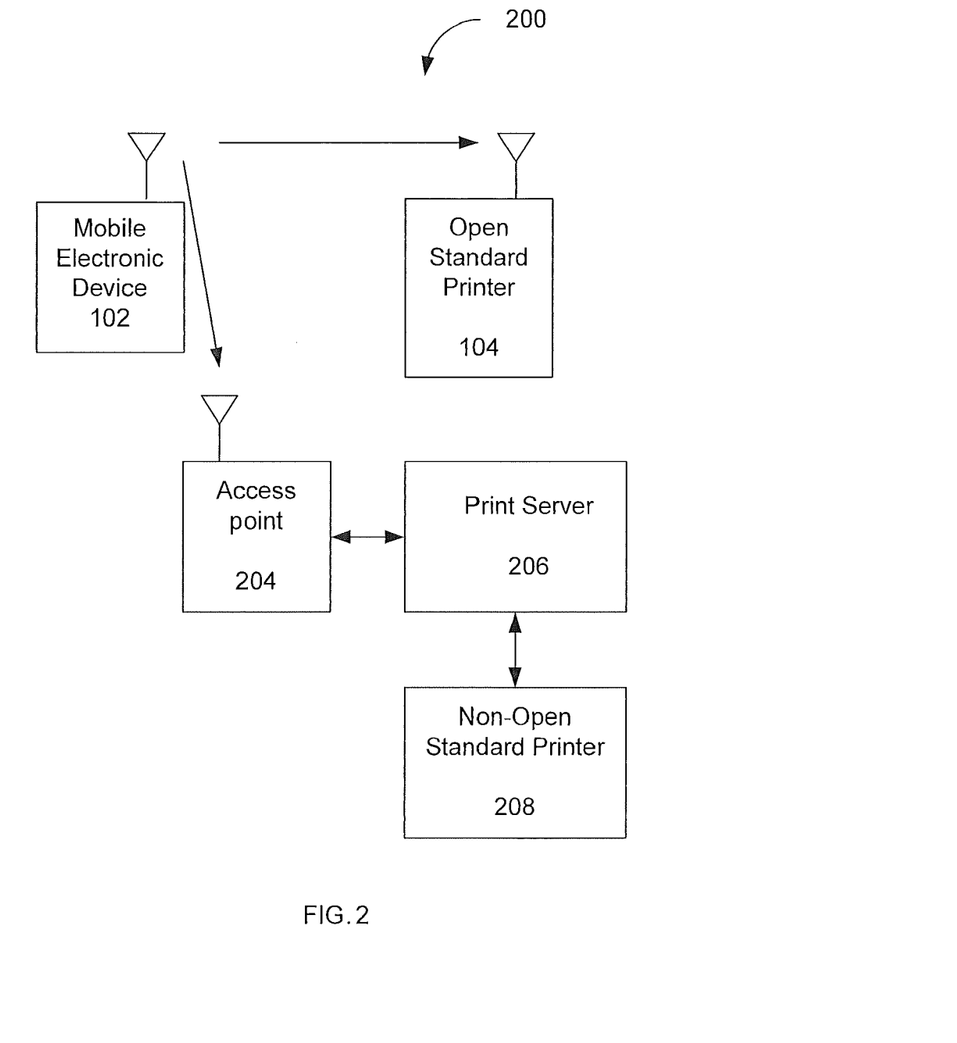
FIG. 2 is a more detailed block diagram illustrating an example that includes a wireless connection between a mobile wireless device and a wireless access point.

FIG. 2 illustrates a more detailed block diagram 200 that includes a wireless connection 202 between mobile wireless device 102 and a wireless access point 204. The wireless access point 204 is connected to the print server 206 through an example wired network, e.g., Ethernet. In the illustrated example the print server is connected to a non-mobile electronic device specific print standard printer using the Ethernet network connection. Note that the data from the wireless access point is not communicated directly to the printer, rather, data is communicated from the wireless access point 204 to the print server 206 and then data is communicated from the print server 206 to the printer 208. It will be understood that in other embodiments the connections between the different devices may be wired or wireless. For example, the print server may include a WiFi network connection to communicate directly with the mobile wireless device. The WiFi network connection might also be used to communicate with a non-mobile electronic device specific print standard WiFi enabled printer. Other wireless networks such as cellular, satellite, etc. might be used. (Alternatively a wired connection between the print server and the printer might be used. Example wired networks include wired Ethernet.)

The systems and methods described herein may connect to printer 108, 208 by sending a document using the PDF format. Other exemplary embodiments may connect to the printer 108, 208 by performing a PDF to Post Script conversion or a PDF to PCL conversion. Print server 106, 206 may be small or portable or mobile such that it may be easily carried along with mobile wireless device 102. It is also contemplated that the system provides printer driver management. Printers 108, 208 may include laser printers, inkjet printers, dot matrix printers, or other types of printers, as well as other types of printing devices such as plotters.

Figure 3:
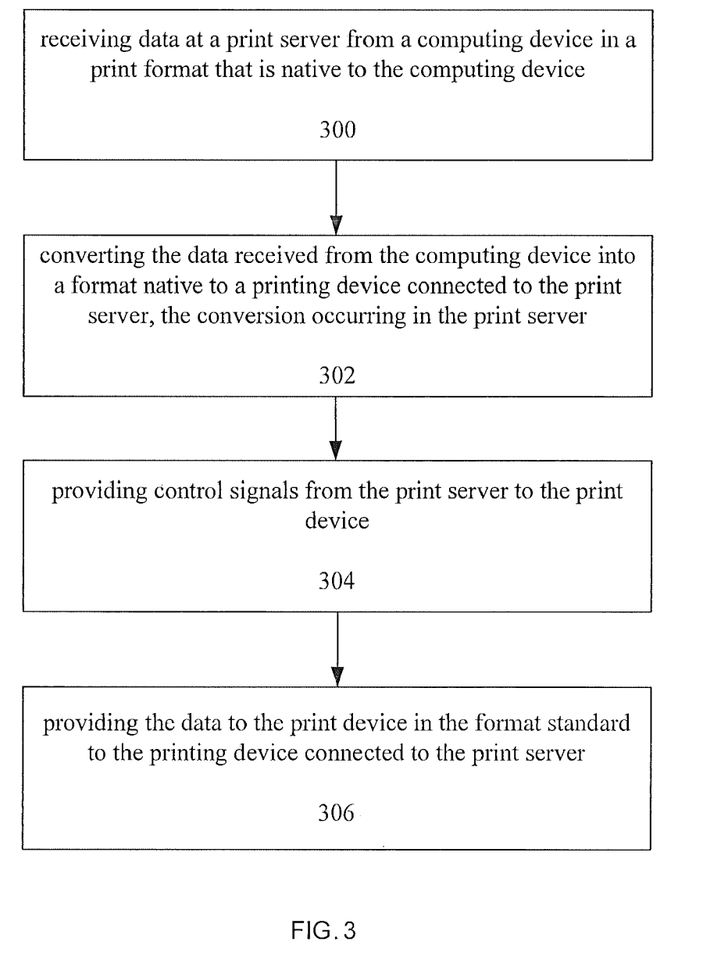
FIG. 3 is a flow diagram illustrating an example method in accordance with some embodiments.

FIG. 3 is a flow diagram illustrating an example method in accordance with some embodiments. In step 300 of a systems and method of printing from a computing device comprising of data is received at a print server from a computing device in a print format that is native to the computing device. The print server may be similar to print servers 106 and 206 described with respect to FIGS. 1 and 2. The computing device may be a mobile electronic device (mobile device) such as a mobile wireless device, e.g. device 102. Accordingly, the computing device may include mobile electronic devices such as an iPad, iPod touch, Android, as well as other types of mobile telephone handsets, notebooks, laptops, and other mobile wireless devices that may print documents to a printer.

In step 302 data received from the computing device can be converted into a format standard to a printing device connected to the print server. In the illustrated embodiment, the conversion occurs in the print server. An exemplary embodiment is to provide a system and method to connect a printer by sending a document using the PDF format. Another exemplary embodiment provides a system and method to connect a printer including performing a PDF to Post Script conversion. Still another exemplary embodiment provides a system and method to connect a printer including performing a PDF to PCL conversion.

In step 304 control signals are provided from the print server to the print device. These control signals may be provided through a wired or wireless interface. For example, the connection between the print server and the printer may be over an 802.11 standards wireless network.

In step 306 data is provided to the print device in the format native to the printing device connected to the print server. The data may be provided through a wired or wireless interface. Again, for example, the connection between the print server and the printer may be over an 802.11 standards wireless network. It will be understood, however, that steps 304 and 306 may be performed using other wireless standards, using wired connections, or using some combination of wired and wireless standards. For example, some print servers may be connected to multiple printers. Some printers may be connected wirelessly, while other printers are connected using wires. The wired connections may include serial connections, such as USB as well as networked connections such as Ethernet.

Figure 4:
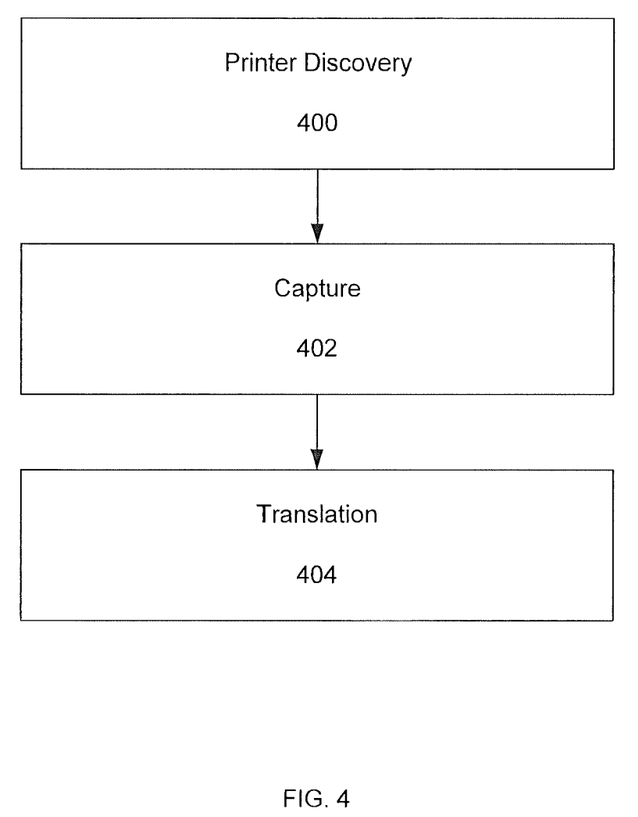
FIG. 4 is another flow diagram illustrating another example method in accordance with some embodiments.

FIG. 4 is another flow diagram illustrating another example method in accordance with some embodiments. In step 400 device discovery occurs. For example, a mobile electronic device may determine what printers are available for printing. These may include printers that are native format to the mobile electronic device and printers that are not native format. The non-native format printing devices may appear to be native format printing devices to the mobile wireless device. For example, a print server may cause a non-native printing device to appear to be a native format printing device. Additionally, the method illustrated in FIG. 4 may include discovery performed using an auto discovery system. For example, discovery in step 400 may use Multicast DNS (mDNS), unicast Domain Name System, Simple Service Discovery Protocol (SSDP) or other discovery protocols.

Capture occurs in step 402. The material to be captured can be transmitted from the mobile wireless device to the print server. In step 404 translation occurs. This can occur at the print server and allows a non-native printing device to print the material received from the mobile wireless device. For example, the mobile wireless device may connect to a printer by sending a document using the PDF format. The PDF format might be translated to the Post Script format, PCL format, or other format by the print server, and then transmitted to the printer for printing.

Some embodiments of the systems and methods described herein may use Bonjour, which is a trade name for an implementation of a group of technologies that includes service discovery, address assignment, and name resolution. Bonjour may be used to locate printers, computers, services, etc.

Bonjour is a trade name for Apple, Inc.'s implementation of Zeroconf, a group of technologies that includes service discovery, address assignment, and name resolution. Zero configuration networking (Zeroconf), is a set of techniques that automatically creates a usable Internet Protocol (IP) network without manual operator intervention or special configuration servers. Zero configuration networking can allow devices such as computers and printers to connect to a network automatically. The three basic functions include assignment of numeric network addresses for networked devices, automatic resolution, distribution of computer hostnames, and automatic location of network services, such as printing devices. Bonjour locates devices such as printers, other computers, and the services that those devices offer on a local network using multicast Domain Name System (mDNS) service records. Bonjour provides a general method to discover services on a local area network.

Figure 5:
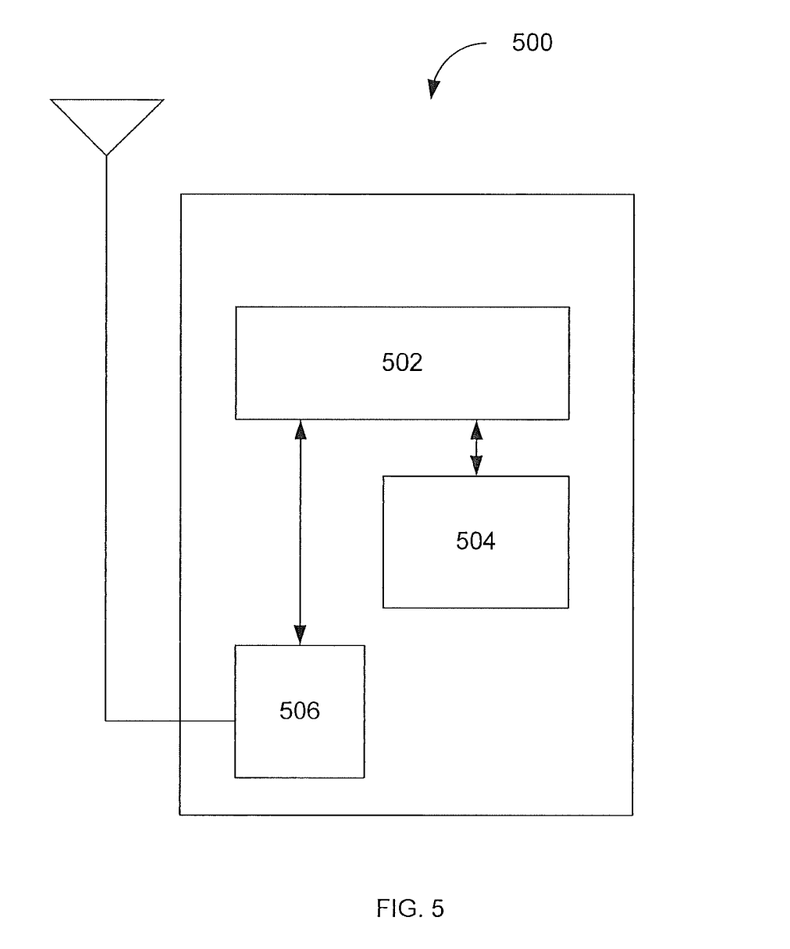
FIG. 5 is a block diagram illustrated an example print server in accordance with some embodiments.

FIG. 5 is a block diagram illustrated an example print server 500 in accordance with some embodiments of the systems and methods described herein. The print server 500 includes a processor 502. The processor 502 can execute instructions implementing the systems and methods for printing from a mobile wireless device to a printing device that does not include wireless device specific print drivers.

The processor 502 may be a microprocessor, microcontroller, digital signal processor, digital logic, programmable digital logic, gate array, field programmable gate array (FPGA), application specific integrated circuit (ASIC), or other processing device. The processor 502 may include digital circuitry, analog circuitry, or both. Additionally, processor 502 may include a single processing device or multiple devices. When multiple processing devices are used, these may include more than one of the same device, multiple types of devices, or combinations of these. The processor may include one or more co-processors.

A memory 504 is coupled to the processor 502. The memory 504 can store instructions and data. These instructions may cause the processor 502 to perform a number of steps. For example, the processor 502 may provide for a system that receives data from a computing device in a print format that is native to the computing device. The system can process the data received from the computing device into a format native to a printing device connected to the print server. The system may also provide control signals to the print device and provide the data to the print device in the format native to the print device connected to the print server.

Memory 504 may include semiconductor memory. The semiconductor memory may include volatile memory, non-volatile memory, or both. The non-volatile memory may be flash memory, ROM, PROM, EPROM, EEPROM, or other types of non-volatile memory such as FeRAM, CBRAM, PRAM, SONOS, RRAM, Racetrack memory, NRAM and Millipede. Non-volatile memory may be used to store instructions. Volatile memory can include RAM, such as DRAM or SRAM, as well as other types of RAM such as Z-RAM, TTRAM, A-RAM and ETA RAM.

Processor 502 can be connected to a transceiver 506, which can be connected to an antenna. Transceiver 506 may be used to wirelessly connect the print server 500 to a wireless printer, to the internet, or to other devices that include wireless connectivity. In an example embodiment the wireless connection may be an 802.11 wireless connection, or other type of wireless connection.

FIG. 5 provides a simplified block diagram of an example print server. Accordingly, to simplify the block diagram some details are not included. For example, print server 500 may be powered by standard household power, by battery, or may include circuitry for both. These details are not shown. It will be understood that additional circuitry may be included in the print server. Further, details within the blocks of the block diagram, such as circuitry implementing a processor have not been included. As will be understood by a person of ordinary skill in the art, many different types of processor, memory, transceiver, etc. may be used. For example, transceiver 506 may be a circuit for transmitting and receiving electromagnetic signals. In other embodiments, transceiver 506 might be replaced by a separate transmitter circuit, a separate receiver circuit, or both.

In some embodiments the print server 500 may include a first printer-specific driver. For example, the printer-specific driver may be stored in memory 504. The first printer-specific driver can include instructions that cause the processor 502 to provide the data to the print device in the format native to the print device connected to the print server.

Additionally, in some embodiments, a print driver database is stored in a cloud of networked computers. These print drivers may be accessed as necessary from "the cloud." For example, the print server may include instructions causing the processor to discover a printer on a network the print server is connected to. This can include determining a printer model and manufacturer for the discovered printer. The embodiment can map the printer model to a driver needed. Based on the mapping from the printer model the needed driver may be downloading.

In an embodiment, the print server 500 may download a second printer-specific driver from the cloud as needed when a printer that is not supported by the first printer-specific driver is connected to the print server. The second printer-specific driver may support the printer that is not supported by the first printer-specific driver. In some embodiments memory 504 may store multiple printer specific drivers. Others may store only one driver at a time; as necessary drivers may be overwritten by new drivers. Various schemes may be used to determine when drivers are overwritten, such as first in first out (FIFO). In some embodiments the system may track usage of particular drivers or track printers that are connected to the print server 500. The least used driver might be overwritten in some case. Other embodiments might overwrite one or more drivers for printers that are no longer connected to the print server or that have been disconnected from the server the longest.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration,

What is claimed:
1. A print server, comprising:
 a processor;
 a memory coupled with the processor, the memory storing a set of instructions for enabling the processor to:
 receive data from a computing device in a print format native to the computing device;

process the data received from the computing device into a print format native to a printing device coupled with the print server, wherein the print format native to the computing device is different from the print format native to the printing device;

provide at least one control signal to the printing device;

provide the data to the printing device in the format native to the printing device;

download a first printer-specific driver to the print server that provides the data to the printing device in the format native to the printing device;

download a second printer-specific driver from a print driver database storable in a cloud of networked computers, as needed, when another printing device is not supported by the first printer-specific driver, the second print-specific driver capable of supporting the other printing device that is not supported by the first printer-specific driver; and wherein the print server is configured to poll a predetermined website and determine availability of at least one updated print driver.

2. The print server recited in claim 1,
wherein the set of instructions enable the print server to communicate with the computing device,
wherein the computing device comprises a portable device,
wherein the set of instructions enable communication with a printer lacking a mobile electronic device specific print standard interface, and
wherein the print server is configured to receive at least one document for printing using the mobile electronic device specific print standard over a WiFi connection.

3. The print server recited in claim 1, further comprising a set of additional instructions for enabling the processor to:
discover a printer on a network with which the print server is coupled and to determine a printer model therefor;
mapping the printer model to a driver needed; and
downloading the driver based on the mapping from the printer model.

4. The print server of claim 1, wherein the set of instructions enables the print server to:
receive a mobile electronic device specific print standard formatted document,
format the data relating to the document for printing using a printer-specific driver, and
transmit the data relating to the document to the printing device.

5. The print server of claim 1, wherein the print server is coupled with the printing device over a WiFi network.

6. The print server of claim 1,
wherein the set of instructions enables the print server to perform at least one of device discovery, capture, and translation;
wherein discovery is performed using an auto-discovery system; and
wherein the auto-discovery system comprises at least one of a multicast domain name system, a unicast domain name system, and a zero-configuration networking.

7. The print server of claim 1, wherein the print server connects to a printing device by sending at least one document using at least one of a PDF format, a Post Script format, and a PCL format.

8. The print server of claim 1, wherein the print server provides a printer driver management.

9. The print server of claim 1, wherein the print server provides a connection between a plurality of devices by using at least one of a USB connection, an Ethernet connection, and an 802.11 communication.

10. The print server of claim 1, wherein the print server provides for manually entering printer information.

11. The print server of claim 1, wherein the print server automatically discovers the printing device and automatically downloads a driver for the printing device.

12. A method of printing from a computing device by way of a print server, comprising:
receiving data at the print server from a computing device in a print format native to the computing device;
converting the data received from the computing device into a print format native to a printing device coupled with a print server, the converting occurring in the print server, wherein the print format native to the computing device is different from the print format native to the printing device;
providing control signals from the print server to the printing device;
providing the data to the printing device in the print format native to the printing device;
downloading a first printer-specific driver to the print server that provides the data to the printing device in the format native to the printing device;
downloading a second printer-specific driver from a print driver database storable in a cloud of networked computers, as needed, when another printing device is not supported by the first printer-specific driver, the second print-specific driver capable of supporting the other printing device that is not supported by the first printer-specific driver; and
wherein the print server is configured to poll a predetermined website and determine availability of at least one updated print driver.

13. The method recited in claim 12, further comprising:
communicating with the computing device;
communicating with the printing device, the printing device lacking a mobile electronic device specific print native interface; and
configuring the print server to receive a document for printing using the mobile electronic device specific print standard over a WiFi connection.

14. The method of claim 12, further comprising:
receiving a mobile electronic device specific print standard formatted document;
formatting the data for printing using a printer-specific driver, and
transmitting the data to the printing device.

15. The method of claim 12, further comprising connecting to the printing device over a WiFi network.

16. The method of claim 12, further comprising performing at least one of device discovery, capture, and translation,
wherein discovery is performed using an auto-discovery system; and
wherein the auto-discovery system comprises at least one of a multicast domain name system, a unicast domain name system, and a zero-configuration networking.

17. The method of claim 12, further comprising sending a document using at least one of a PDF format, a Post Script format, and a PCL format.

18. The method of claim 12, further comprises providing a printer driver management.

19. The method of claim 12, further comprising providing a connection between a plurality of devices by using at least one of a USB connection, an Ethernet connection, and a 802.11 communication.

20. The method of claim 12, further comprising:
discovering the printing device;
capturing data from the printing device; and
translating the data from the printing device.

* * * * *